United States Patent [19]
Joo et al.

[11] Patent Number: 5,989,309
[45] Date of Patent: Nov. 23, 1999

[54] METHOD FOR INJECTING FINE IRON ORE IN SMELTING REDUCING PROCESS

[75] Inventors: Sang Hoon Joo; Sang Deok Lee; Il Ock Lee, all of Pohang, Rep. of Korea; Werner L. Kepplinger, Leonding; Felix Wallner, Linz, both of Austria

[73] Assignees: Pohang Iron & Steel Co., Ltd.; Research Institute of Industrial Science & Technology, both of Rep. of Korea; Voest-Alpine Industrieanlagenbau GmbH, Austria

[21] Appl. No.: 08/894,852
[22] PCT Filed: Dec. 24, 1996
[86] PCT No.: PCT/KR96/00245
 § 371 Date: Aug. 28, 1997
 § 102(e) Date: Aug. 28, 1997
[87] PCT Pub. No.: WO97/24462
 PCT Pub. Date: Jul. 10, 1997

[30] Foreign Application Priority Data

Dec. 29, 1995 [KR] Rep. of Korea .................. 95-65207

[51] Int. Cl.⁶ ............................................ C21B 11/00
[52] U.S. Cl. ................. 75/453; 75/491; 75/492; 75/502; 75/961
[58] Field of Search ................ 75/446, 961, 492, 75/491, 502, 453

[56] References Cited

U.S. PATENT DOCUMENTS

| | | | |
|---|---|---|---|
| 4,202,534 | 5/1980 | Davis, Jr. ................................ | 266/157 |
| 4,851,039 | 7/1989 | Papst et al. ............................. | 75/10.22 |
| 4,978,387 | 12/1990 | Kepplinger ............................. | 75/445 |
| 5,338,336 | 8/1994 | Greenwalt ............................... | 75/492 |
| 5,470,375 | 11/1995 | Greenwalt ............................... | 75/505 |

FOREIGN PATENT DOCUMENTS

| 0488429 | 6/1992 | European Pat. Off. . |
|---|---|---|
| 938750 | 5/1993 | Rep. of Korea . |

OTHER PUBLICATIONS

Korean Patent Application No. 93–8750 Abstract, May 21, 1993, 1 p., English–language.

*Primary Examiner*—Prince Willis
*Assistant Examiner*—Tima McGuthry-Banks
*Attorney, Agent, or Firm*—Webb Ziesenheim Logsdon Orkin & Hanson, P.C.

[57] ABSTRACT

A method for injecting fine iron ore in a smelting reducing process is disclosed, in which the carrier gas for the iron ore is the discharge gas from a melter gasifier without the need of separate carrier gas. It includes the steps of pre-reducing iron ore in a pre-reduction furnace, melting and reducing it in the melter gasifier, supplying the discharge gas from the melter gasifier through an ascending tube to a cyclone and to said pre-reduction furnace, directing the cooled and cleaned fine iron ore through a recycling system and a melting burner into the melter gasifier. A part of the discharge gas is supplied through a venturi scrubber, a first compressor and a circulating tube into an ascending tube. A part of the compressed gas circulating through the tube is recompressed by means of a second compressor and fine iron ore from a stored source is injected into ascending the tube by the recompressed gas by means of a pneumatic fine iron ore conveying system.

8 Claims, 3 Drawing Sheets

METHOD FOR INJECTING FINE IRON ORE IN SMELTING REDUCING PROCESS

FIELD OF THE INVENTION

The present invention relates to a method for injecting fine iron ore in a smelting-reducing process. More specifically, the present invention relates to a method for injecting fine iron ore, in which, in order to lower the temperature of discharge gas (reducing gas) from a melter gasifier, a fine iron ore is injected by utilizing a part of a circulating cooling gas as carrying gas.

DESCRIPTION OF THE PRIOR ART

A typical smelting-reducing method is disclosed in U.S. Pat. No. 4,978,387, in which iron ore and coal are directly used without carrying out a pre-treating process so as to produce hot metal.

In the method of U.S. Pat. No. 4,978,387, the iron ore and the ordinary coal are directly used, and the pre-treating processes such as sintering process and the coking process are omitted. Therefore, compared with other pig iron manufacturing processes such the as blast furnace process, the process and facilities are simplified. That is, as the shown in FIG. 1, the facility for carrying out the method includes: a melter gasifier 11 for converting the coal into a gas and for melting the reduced iron ore; a pre-reduction furnace 12 for indirectly reducing the iron ore by using the reducing gas generated in the melter gasifier 11; and other auxiliary facilities.

The operating temperature of the melter gasifier is 1050° C. which is the condition of the complete decomposition of the tar component of the coal. The pre-reduction furnace is maintained at an operating temperature of 850° C. which is the optimum condition for the indirect reduction of the iron ore.

Therefore, in order to lower the high temperature of the gas of the melter gasifier to 850° C., a part of the gas which is produced in the melter gasifier is cooled down and cleaned by a venturi scrubber 17, and is subjected to a pressure stepup in a compressor 18, before being sent to an ascending tube 13. Meanwhile, the dust which is produced in the melter gasifier is separated by a cyclone 14, and passes through a dust recycling system 15. Then the dust is reinjected by a melting burner 16 into the melter gasifier in a molten condition to, thus, fall by gravity into the melter gasifier 11, thereby minimizing the losses of the fuel and the raw material.

However, the above described method has the disadvantage that only sized ore and sized coal of the optimum size (8–35 mm) can be used.

The present inventors have developed a method for alleviating the restriction of the size, and filed a patent application under Korean Patent Application No. 93-8750.

In this technique, a fine iron ore is injected into an ascending tube 13 of the melter gasifier 11 or into the recycling system 15. Then the fine iron ore together with the dust from the cyclone 14 is injected into the melter gasifier 11 by means of the melting burner 16, thereby melting and agglomerating the fine iron ore and dust. Thus the redustification is prevented, and the fine iron ore can be directly used.

However, in this technique, only the conception of injecting the fine iron ore into the melter gasifier is provided, but no descriptions are presented as to how the fine iron ore can be injected.

SUMMARY OF THE INVENTION

The present invention is intended to overcome the above described disadvantages of the conventional techniques.

Therefore it is an object of the present invention to provide a method for injecting a fine iron ore in a smelting reducing process for manufacturing a hot metal by using a fine iron ore, in which the fine iron ore is carried by utilizing a discharge gas from a melter gasifier, so that a separate gas for carrying and injecting the fine iron ore would not be required, and that the fine iron ore can be injected without any variation in the amount and composition of the process gas.

In achieving this object, the method for injecting a fine iron ore in a smelting reducing process according to the present invention includes the steps of: pre-reducing an iron ore by utilizing a discharge gas generated in a melter gasifier; smelting and reducing the pre-reduced iron ore in the melter gasifier; supplying the discharge gas of the melter gasifier through an ascending tube and a cyclone to a pre-reduction furnace; directing the fine iron ore (cooled down and cleaned by the cyclone) through a recycling system and a melting burner into the melter gasifier; and supplying a part of the discharge gas (passed through the cyclone) through a venturi scrubber, a compressor and a compressed gas circulating tube into the ascending tube, and the method further includes the steps of:

recompressing a part of the compressed gas which circulates through the compressed gas circulating tube; and injecting the fine iron ore into the ascending tube by utilizing the recompressed gas.

BRIEF DESCRIPTION OF THE DRAWINGS

The above object and other advantages of the present invention will become more apparent by describing in detail the preferred embodiment of the present invention with reference to the attached drawings in which.

DETAILED DESCRIPTION OF THE PREFERRED EMBODIMENT

Figure 2:
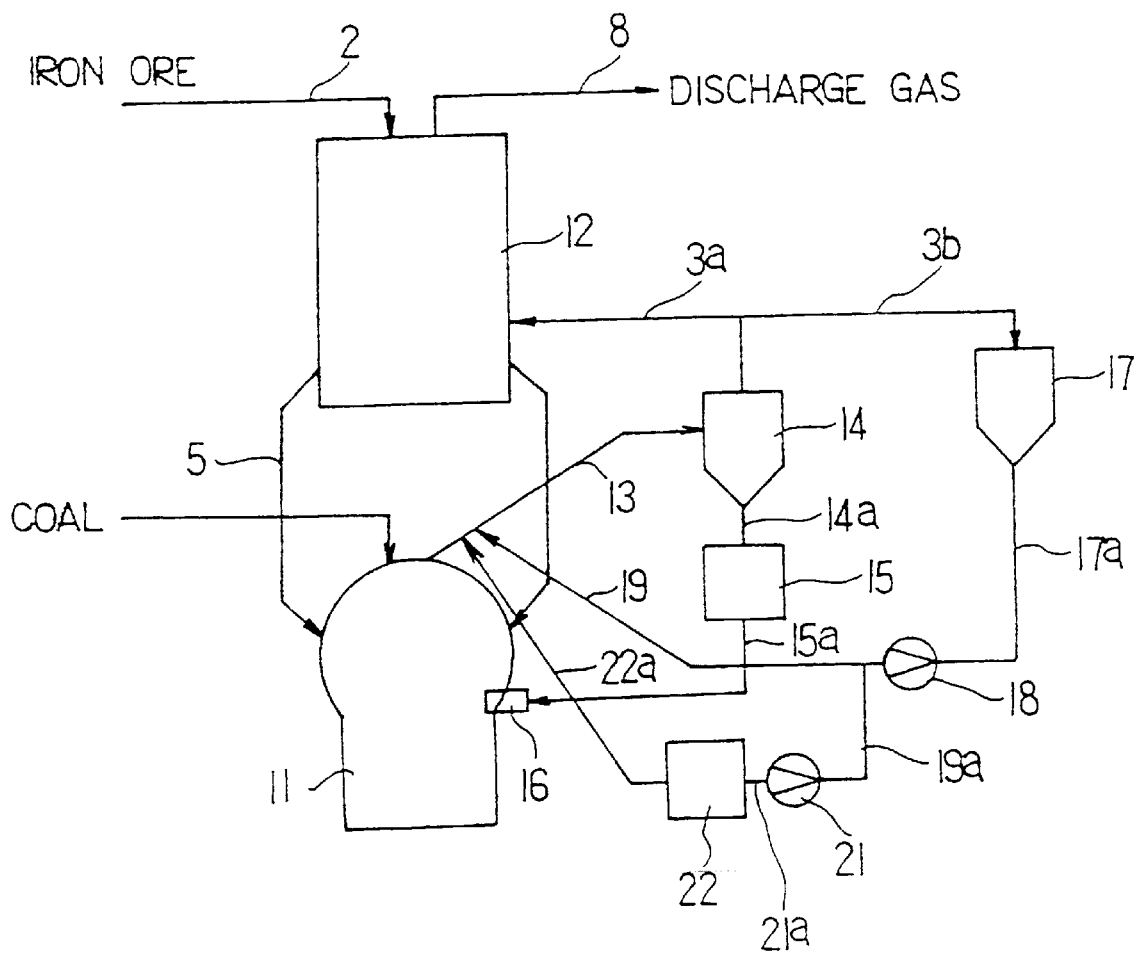
FIG. 2 is a schematic illustration showing the smelting reduction system according to the present invention.
Figure 3:
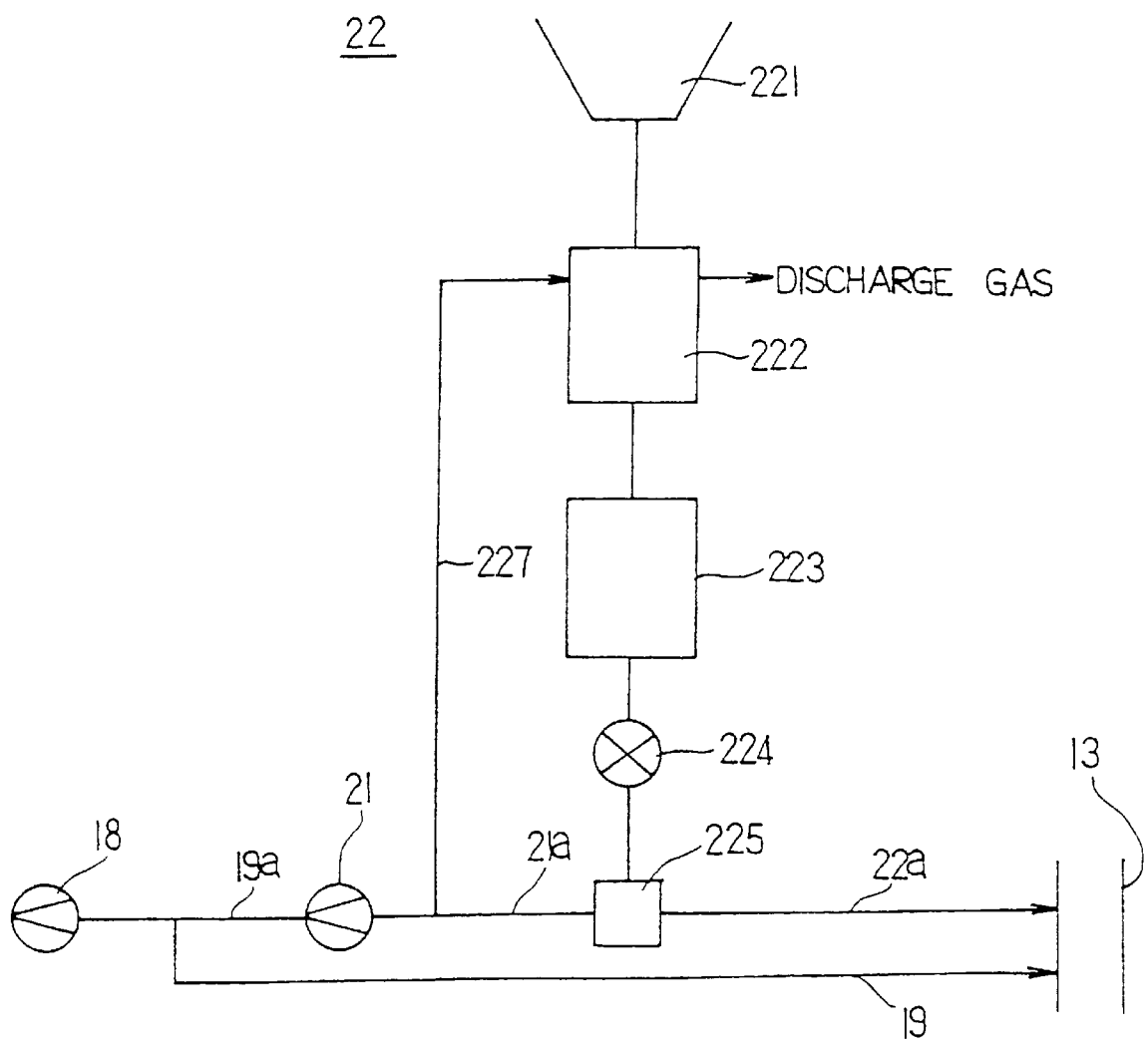
FIG. 3 is a detailed illustration of the pneumatic fine iron ore conveying system of the smelting reduction system of FIG. 2.

FIGS. 2 and 3 illustrate an embodiment of the smelting reduction system according to the present invention wherein like elements are identified by like reference numerals in the various figures of the drawings.

As shown in FIG. 2, the smelting reduction system to which the method of the present invention is applied includes: a melter gasifier 11 for gasifying the coal and for melting the reduced ore; a pre-reduction furnace 12 for indirectly reducing an iron ore by utilizing the discharge gas of the melter gasifier 11; a cyclone 14 for receiving the discharge gas from the melter gasifier 11 through an ascending tube 13 to capture the fine iron ore from the discharge gas so as to send it to a recycling system 15, and for supplying the fine iron ore and the separated discharge gas to the pre-reduction furnace 12; a melting burner 16 installed on the melter gasifier 11, for spouting the fine iron ore of the recycling system 15 into the melter gasifier 11; a venturi scrubber 17 for receiving a part of the discharge gas of the cyclone 14, to collect dust and cool it; a compressor 18 for compressing the cooled gas of the venturi scrubber 17 so as to supply the compressed gas through a compressed gas circulating tube 19 to the ascending tube 13; a second compressor 21 for recompressing a part of the compressed gas; and a pneumatic fine ore conveying system 22 for supplying the fine iron ore to the ascending tube 13 by utilizing the recompressed gas of the second compressor 21.

The melter gasifier 11 and the pre-reduction furnace 12 communicate together through a reduced ore discharge tube 5. The pre-reduction furnace 12 is connected to a discharge gas discharging tube 8, and to an iron ore supplying tube 2 for supplying a fine iron ore.

The pre-reduction furnace 12 communicates with the cyclone 14 through a first discharge gas circulating tube 3a. The venturi scrubber 17 communicates with the cyclone 14 through a second discharge gas circulating tube 3b.

The venturi scrubber 17 communicates with the compressor 18 through a cooling gas circulating tube 17a. The compressor 18 communicates with the ascending tube 13 and the second compressor 21 through a compressed gas circulating tube 19 and a second compressed gas circulating tube 19a respectively. The second compressor 21 communicates with the pneumatic fine ore conveying system 22 through a third compressed gas circulating tube 21a. The pneumatic fine ore conveying system 22 communicates with the ascending tube 13 through a fine ore supplying tube 22a.

The recycling system 15 communicates with the cyclone 14 through a first fine iron ore circulating tube 14a, and is connected through a second fine iron ore circulating tube 15a to the melting burner 16.

FIG. 3 is a more detailed illustration of the pneumatic fine ore conveying system 22 of the smelting reduction system depicted in FIG. 2.

As shown in FIG. 3, the pneumatic fine iron ore conveying system 22 includes a raw material storing vessel 221, a lock vessel 222, a dispensing vessel 223, a raw material dispensing feeder 224 and an injector 225.

In the present invention, the pneumatic fine iron ore conveying system is constituted as follows. The, the gas which is supplied from compressor 18 via the second compressed gas recirculating tube 19a is recompressed by the second compressor 21 and is supplied through the third gas circulating tube 21a to the injector 225, and is supplied through a fourth compressed gas circulating tube 227 to the lock vessel 222.

In the present invention, as depicted schematically in FIGS. 2 and 3, the pre-reduction furnace 12 pre-reduces the iron ore by utilizing the discharge gas of the melter gasifier 11. The iron ore which has been pre-reduced is smelt-reduced by the melter gasifier 11. The discharge gas of the melter gasifier 11 is supplied through the ascending tube 13 and the cyclone 14 to the pre-reduction furnace 12. The ore fines which are collected by the cyclone 14 are directed through the recycling system 15 and the melting burner 16 into the melter gasifier 11. A part of the gas which has passed through the cyclone 14 is supplied through the venturi scrubber 17, the compressor 18 and the compressed gas circulating tube 19 to the ascending tube 13. Thus the method can be applied to the smelting reduction for manufacturing a hot metal.

For injecting the fine iron ore according to the present invention, a part of the gas which has passed through the compressed gas circulating tube 19 is transported by the second compressed gas circulating tube 19a and is recompressed by the second compressor 21, and the fine iron ore from the raw material storing vessel 221 is injected into the ascending tube 13 by means of a tube 22a of the pneumatic fine iron ore conveying system 22 by utilizing the recompressed gas. The fine iron ore which has been injected into the ascending tube 13 is directed through the cyclone 14, the recycling system 15 and the melting burner 16 into the melter gasifier 11.

In the case where the pneumatic fine iron ore conveying system of FIG. 3 is used, the cooling reducing gas is subjected to a pressure stepup, and then, the gas is supplied to the lock vessel 222, dispensing vessel 223 and to the injector 225 installed beneath the pneumatic fine iron ore conveying system 22. By utilizing the cooling reducing gas as the carrying medium, the fine iron ore from the raw material storing vessel 221 is injected into the ascending tube 13 of the melter gasifier 11 under operation with a pressure of 3.0–3.5 $Kg/cm^2$. The fine iron ore thus injected undergoes a heating and a partial reduction by being transported by the rising gas in the ascending tube 13. The fine iron ore and the dust are separated by the cyclone 14, and then, are supplied through the recycling system 15 and the melting burner 16 into the melter gasifier 11. The carbon then reacts with oxygen which is injected by a dust burner, so as to be burned. Owing to the combustion heat, the pre-reduced fine iron ore is melted and agglomerated, so it falls down to below the melter gasifier, with the result that it undergoes a smelting reduction, thereby producing a hot metal.

The pressure within the ascending tube should be preferably 3.0–3.5 $Kg/cm^2$.

Further, it is desirable that the compressor 18 should compress the gas to a pressure of 3.7–4.2 $Kg/cm^2$.

Further, it is desirable that the second compressor 22 should compress the gas to a pressure of 5–10 $Kg/cm^2$.

For example, the discharge gas of the melter gasifier 11 is composed of 60–65% of CO, 25–30% of $H_2$, 3–5% of $CO_2$ and 2–4% of $N_2$.

Now the action and effect of the present invention will be described.

The gas which is produced by the melter gasifier 11 has a high temperature of 1000–1100° C., which is produced through the complete decomposition of a large amount of the tar which is the volatile material contained in the coal. However, the optimum temperature in the pre-reduction furnace 12 is 850° C., and therefore, about 20% of the produced reducing gas is collected by the venturi scrubber 17 so as to cool it. Then the cooled gas is compressed by the compressor 18, and then, the compressed gas is recirculated into the lower portion of the ascending tube 13 of the melter gasifier 11, thereby adjusting the temperature of the gas.

In the present invention, in order to inject the fine iron ore in the smelting reducing process, a part of the recirculated gas is collected in tube 19a so as to recompress it in the second compressor 21. Then the recompressed gas is supplied to the pneumatic fine ore conveying system 22, so that the recompressed gas can be used for carrying the fine iron ore delivered from the stored source of fine iron ore 221 into the ascending tube 13 of the smelting reducing furnace.

The carrying gas which carries the fine iron ore should be an inert or reducing gas, so that the carrying gas does not react with the reducing gas or the fine particles, and the thermal or material balance is not influenced during the process. In view of this, nitrogen may be used, but when nitrogen is used, a separate nitrogen supplying device is required, and the nitrogen gas is mixed with the reducing gas. If the nitrogen content within the reducing gas exceeds about 10%, the reducing speed is slowed in the reducing furnace.

Further, if the inert gas is used, a separate expense is incurred for the cost of the gas.

If the present invention is applied to injecting the fine iron ore in the smelting reducing process, that is, if a part of the conventional circulating gas (which is composed of about 65% of CO, 25% of $H_2$, 5% of $CO_2$ and 3% of $N_2$) is used as the carrying gas, not only is there no variation in the amount of the total carried gas in the ascending tube, but also there is no change in the composition of the reducing gas supplied to the reducing furnace. Therefore the iron ore reducing operation is possible in a state with the existing conditions unchanged. Further, an additional expense is not incurred.

Now the present invention will be described based on an actual example.

A testing facility was prepared in the COREX C-2000 plant, for testing the fine iron ore operation. In the existing COREX c-2000 tower, there is no space for installation of a pneumatic fine ore conveying system, and therefore, at a distance of 10 m from the COREX main tower, there was installed a fine iron ore carrying tower which included a fine iron ore storing facility and a pneumatic fine iron ore conveying system. The pneumatic fine iron ore conveying distance consisted of a horizontal distance of 45 m and a vertical distance of 40 m. The pneumatic conveying condition for the fine iron ore was a minimum pressure of 9 $Kg/cm^2$, and this was determined in accordance with the conveying distance. As to the carrying gas for pneumatically carrying the fine iron ore to the ascending tube of the melter gasifier, nitrogen having a pressure of 11 $Kg/cm^2$ was supplied so as to reduce its pressure to 10 $Kg/cm^2$.

Thus the fine iron ore could be injected into the ascending tube.

What is claimed is:

1. A method for injecting a fine iron ore in a smelting reducing process, comprising the steps of:

pre-reducing an iron ore in a pre-reduction furnace by utilizing a discharge gas generated in a melter gasifier;

smelting and reducing the pre-reduced iron ore in said melter gasifier;

supplying the discharge gas of said melter gasifier through an ascending tube to a cyclone and to said pre-reduction furnace;

directing a fine iron ore collected by said cyclone through a recycling system and a melting burner into said melter gasifier;

supplying a part of the discharge gas from said cyclone through a venturi scrubber, a first compressor and a compressed gas circulating tube into said ascending tube, recompressing by means of a second compressor a part of the compressed gas which circulates through said compressed gas circulating tube;

providing a stored source of fine iron ore; and injecting the fine iron ore from said stored source into said ascending tube by utilizing the recompressed gas by a pneumatic fine iron ore conveying system for preheating and partially reducing said fine iron ore in said ascending tube.

2. The method as claimed in claim 1, wherein said pneumatic fine iron ore conveying system comprises a raw material storing vessel which provides said stored source of fine iron ore, said system further comprises a lock vessel, a dispensing vessel, a raw material dispensing feeder and an injector, wherein said vessels are in fluid communication with each other and with said feeder and injector, and wherein the recompressed gas of said second compressor is supplied to said lock vessel and to said injector to permit the pneumatic injection of fine iron ore from said raw material storing vessel into said ascending tube.

3. The method as claimed in claim 2, wherein the gas recompressed by said second compressor has a pressure of 5–10 $Kg/cm^2$.

4. The method as claimed in claim 3, wherein the discharge gas discharged from said melter gasifier is composed of: 60–65% of CO, 25–30% of $H_2$, 3–5% of $CO_2$, and 2–4% of $N_2$;

said ascending tube has an internal pressure of 3.0–3.5 $Kg/cm^2$; and the gas compressed by said first compressor has a pressure of 3.7–4.2 $Kg/cm^2$.

5. The method as claimed in claim 2, wherein the discharge gas discharged from said melter gasifier is composed of: 60–65% of CO, 25–30% of $H_2$, 3–5% of $CO_2$, and 2–4% of $N_2$;

said ascending tube has an internal pressure of 3.09–3.5 $Kg/cm^2$; and the gas compressed by said first compressor has a pressure of 3.7–4.2 $Kg/cm^2$.

6. The method as claimed in claim 1, wherein the gas recompressed by said second compressor has a pressure of 5–10 $Kg/cm^2$.

7. The method as claimed in claim 6, wherein the discharge gas discharged from said melter gasifier is composed of: 60–65% of CO, 25–30% of $H_2$, 3–5% of $CO_2$, and 2–4% of $N_2$;

said ascending tube has an internal pressure of 3.0–3.5 $Kg/cm^2$; and the gas compressed by said first compressor has a pressure of 3.7–4.2 $Kg/cm^2$.

8. The method as claimed in claim 1, wherein the discharge gas discharged from said melter gasifier is composed of: 60–65% of CO, 25–30% of $H_2$, 3–5% of $CO_2$, and 2–4% of $N_2$;

said ascending tube has an internal pressure of 3.09–3.5 $Kg/cm^2$; and the gas compressed by said first compressor has a pressure of 3.7–4.2 $Kg/cm^2$.

* * * * *

UNITED STATES PATENT AND TRADEMARK OFFICE
CERTIFICATE OF CORRECTION

PATENT NO. : 5,989,309
DATED : November 23, 1999
INVENTOR(S) : Sang Hoon JOO et al.

Figure 1:
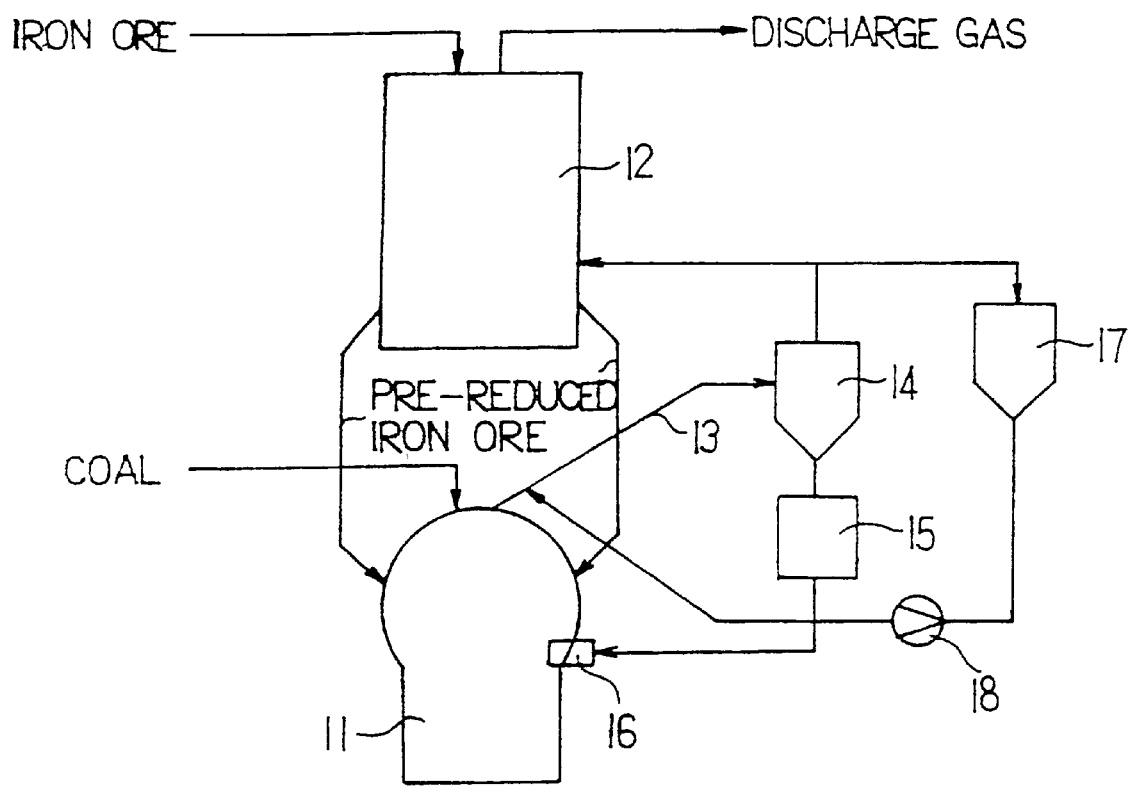
FIG. 1 is a schematic illustration showing the conventional smelting reduction system for manufacturing a hot metal from an iron ore.

It is certified that error appears in the above-identified patent and that said Letters Patent is hereby corrected as shown below:

In the Drawings, on FIG. 1 insert --Prior Art--.

Title Page, [57] ABSTRACT, lines 15-16 "ascending the tube" should read --the ascending tube--.

Column 1 Line 21 after "such as" insert --the--.

Column 1 Line 23 "such the as" should read --such as the--.

Column 1 Line 24 "as the shown" should read --as shown--.

Column 3 Line 42 "The, the gas" should read --The gas--.

Signed and Sealed this

Twenty-fifth Day of July, 2000

Attest:

Attesting Officer

Q. TODD DICKINSON

Director of Patents and Trademarks